United States Patent [19]
Holl

[11] 3,785,151
[45] Jan. 15, 1974

[54] EXHAUST GAS RECIRCULATION SYSTEM
[75] Inventor: William H. Holl, Flint, Mich.
[73] Assignee: General Motors Corporation, Detroit, Mich.
[22] Filed: Oct. 10, 1972
[21] Appl. No.: 296,057

[52] U.S. Cl............... 60/277, 60/278, 60/288, 123/119 A, 165/35, 236/21 R
[51] Int. Cl............... F02m 25/06, F02b 75/10
[58] Field of Search............... 60/278, 279, 288, 60/277; 236/21 R; 165/35; 123/119 A

[56] References Cited
UNITED STATES PATENTS
3,172,251  3/1965  Johnson ................... 60/278
3,338,682  8/1967  Fowler ..................... 60/288
3,648,672  3/1972  Muroki .................... 60/278

Primary Examiner—Douglas Hart
Attorney—J. L. Carpenter et al.

[57] ABSTRACT

An exhuast gas recirculation system in which engine exhaust gases are recirculated to provide over-temperature protection to a catalytic converter in the exhaust system of the engine, the recirculation of a portion of the exhaust gases beginning at a predetermined converter temperature with the amount of exhaust gases being recirculated increasing with increases in converter temperature until such time as all of the exhaust gases are being recirculated back to the engine.

2 Claims, 1 Drawing Figure

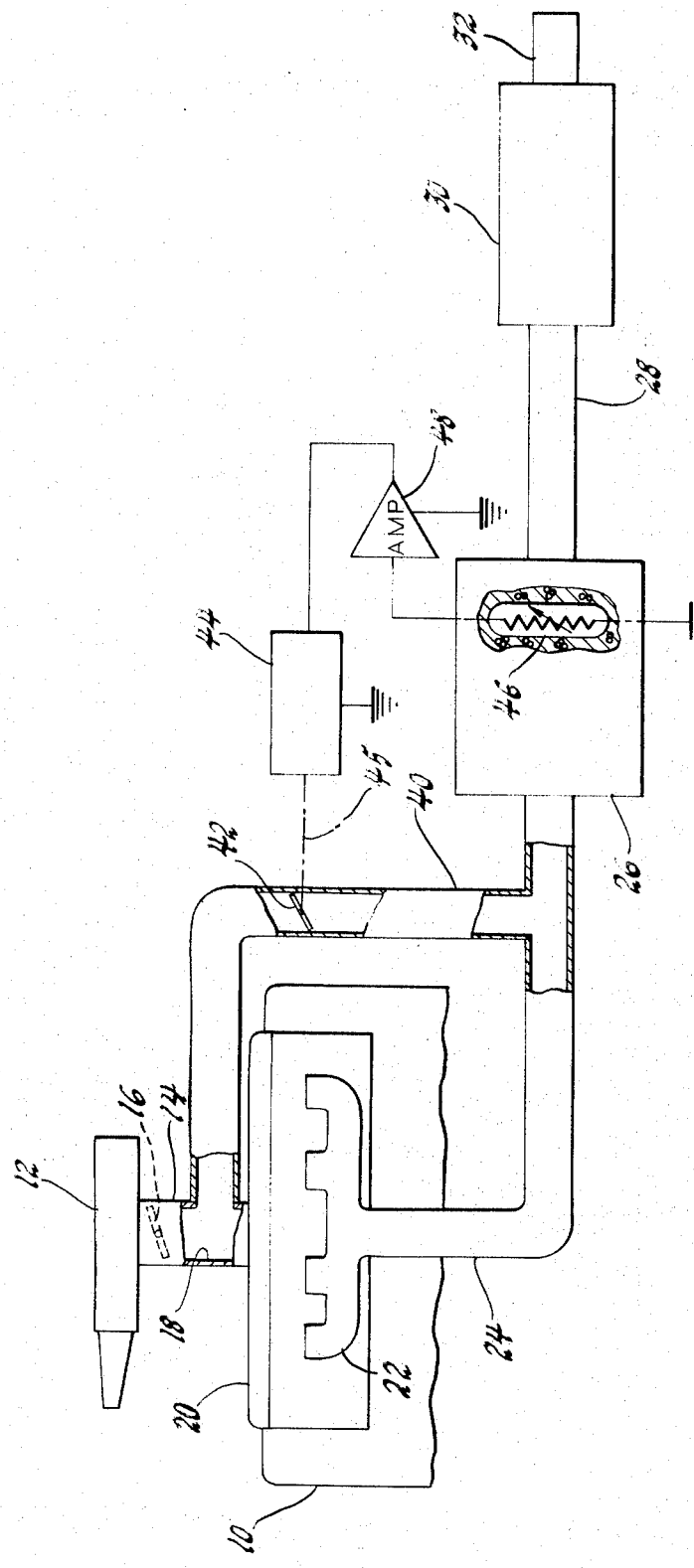

EXHAUST GAS RECIRCULATION SYSTEM

This invention relates to an exhaust gas recirculation system and, in particular, to an exhaust gas recirculation system for catalytic converter over-temperature protection.

During recent years, increasing emphasis has been placed on reducing the amount of objectional components in the exhaust gases discharged from the internal combustion engine of a vehicle. Various devices and systems have been proposed to effect this reduction in exhaust emissions, including the use of a catalytic converter in the downstream end of the exhaust system of the engine. The use of such a catalytic converter can be helpful in rendering the exhaust gases discharged into the atmosphere to be substantially innocuous. However, as is well known, because of the operating temperature conditions at which such catalytic converters operate, their useful life is limited as compared to the life of other engine and vehicle components. In addition, it is also known that operation of the catalytic converter above a predetermined critical operating temperature, even if only for a short interval of time, can result in either damage to the catalytic converter or cause it to deteriorate more rapidly than under normal operating conditions, requiring more frequent replacement of the catalytic converter.

Many devices have been proposed to prevent overheating of a catalytic converter during engine operation, as for example, by the use of a control system to shunt or bypass exhaust gases around the catalytic converter to prevent its operation above a predetermined critical operating temperature. In such a system then, the catalytic converter is in effect being operated in a cycling manner at a temperature below that at which the catalytic converter would start to rapidly deteriorate. In such a system, when the exhaust gases are being shunted or bypassed around the catalytic converter, the thus shunted or bypassed exhaust gases are discharged directly to the atmosphere without any prior treatment thereof to eliminate or reduce the undesirable constituents in these exhaust gases.

Various systems have also been used in the prior art to recycle exhaust gases into the induction system of an engine for various purposes, such as to preheat and vaporize the incoming air-fuel mixture, to reuse the unignited or partially burned portions of the fuel which would otherwise be discharged out the exhaust pipe and, to effect a reduction in combustion temperature in the combustion chambers of the engine to thereby reduce the formation of oxides of nitrogen. In these prior art systems, it has been customary to recycle only a relatively small percentage of the exhaust gases, with a maximum limit up to about 25 percent of the total exhaust gases.

It is therefore the primary object of this invention to improve an exhaust gas recirculating system whereby controlled recirculation of exhaust gases back through the engine is effected as a function of catalytic converter temperature to thereby provide over-temperature protection to the catalytic converter.

Another object of this invention is to improve an exhaust gas recirculating system for protection against over-temperature conditions in a catalytic converter.

These and other objects of the invention are attained by means of an exhaust gas recirculation system wherein flow through the exhaust gas recirculation conduit is controlled by a valve, the opening of which is affected proportionally whereby a portion of the exhaust gases, up to all of the exhaust gases, are recirculated as a function of catalytic converter temperature.

For a better understanding of the invention, as well as other objects and further features thereof, reference is had to the following detailed description of the invention to be read in connection with the accompanying drawing, wherein:

FIG. 1 is a schematic illustration of an internal combustion engine and its exhaust system including an exhaust gas recirculating system in accordance with the invention.

Referring now to the drawing, the internal combustion engine 10 of a vehicle, not shown, has an air cleaner 12 and a carburetor 14 with a throttle valve 16 therein for the controlled flow of an air-fuel mixture through the induction passage 18 to the intake manifold of the engine. Exhaust gases are discharged from the working chambers, not shown, of the engine into exhaust manifold 22 which is connected by an exhaust duct 24 to a catalytic converter 26, the catalytic converter containing a suitable catalyst material, not shown, therein. Downstream, the catalytic converter 26 is connected by an exhaust passage 28 to a conventional muffler 30 to muffle and deaden the exhaust gases before discharge through tailpipe 32 to the atmosphere.

In accordance with the invention, an exhaust gas recirculating conduit 40 is connected in fluid flow relationship at one end to the exhaust duct 24 between the exhaust manifold 22 and catalytic converter 26 and, at its opposite end to the induction passage 18 downstream of throttle valve 16. A gas flow control valve 42 is pivotally mounted in the conduit 40 for movement between a closed position and a full open position. The output shaft of a torque motor 44 is operatively connected to the control valve 42 to effect movement thereof between the closed position and the full open position.

The positioning of the valve 42 between its closed position and fully open position is done as a function of the catalytic converter bed temperature within a predetermined temperature range, as described hereinafter.

In the preferred embodiment of the invention, an electrical system connected to the starter switch, controlled, electrical power system of the vehicle is used to actuate the valve 42 as a function of catalytic converter bed temperature, although it is to be realized that other systems can be used to actuate valve 42 as a function of the catalytic converter bed temperature, such as by the use of a temperature sensitive bimetal spring operatively connected to the valve 42 with the bimetal spring being in thermal contact relationship to the catalytic converter.

As shown in the preferred embodiment, a thermistor 46 located in the catalytic converter bed in catalytic converter 26 in thermal relation to the exhaust gases flow therethrough is used to send an electrical input signal, as a function of catalytic converter bed temperature, to a proportional amplifier 48, the output of which is a current whose magnitude is directly proportional to the catalytic converter bed temperature as heated by the exhaust gases flowing through the catalytic converter. This current is the input to the torque motor 44 having its output shaft 45 operatively connected to valve 42 for moving it between its closed position and full open position. Since the input to the torque motor is directly proportional to the catalytic converter bed temperature, the output shaft will assume a position directly proportional to the catalytic converter bed temperature.

The temperature below which the catalyst and the catalytic converter should be maintained is dependent on the catalyst material being used. For discussion purposes, a temperature of, for example, 1500°F. can be used as the critical temperature for the catalyst material in the catalytic converter. To prevent a temperature override above this 1500°F. temperature limit, recirculation of exhaust gases back to the induction manifold of the engine should begin at a suitable, predetermined lower temperature, for example, 1450°F., with recirculation approaching 100 percent exhaust gas recirculation before a temperature of 1500°F. is reached in the catalytic converter. That is, at a temperature of 1500°F. as sensed by the thermistor in the catalytic converter, all of the exhaust gas is to be recirculated, limited of course only by restrictions in the ducting. Thus, in the limiting temperature condition, as predetermined based on the critical operating temperature of the catalyst material used, little or no exhaust gases pass through the catalytic converter and this then precludes further temperature rise within the catalytic converter.

In this example above, the proportional amplifier 48 would be biased so as not to produce an output current until the catalytic converter bed temperature reached 1450°F. with the output of the amplifier then being proportional throughout the temperature range from 1450°F. to 1500°F. so that the torque motor would effect pivotal movement of the valve 42 from the closed position proportionally during the 50°F. temperature rise between 1450°F. and 1500°F. so that the valve 42 is at the full open position before the temperature reaches 1500°F.

During normal vehicle operation, the most severe over-temperature problem occurs in the catalytic cnverter when the throttle controlling the operation of the engine is closed and the vehicle is decelerating or coasting over a sustained period of time, such as would occur with the vehicle travelling downgrade. Under these engine operating conditions, the combustible emissions from the engine are very high and the burning of these combustibles in the cataytic converter results in catalyst bed temperatures elevated well above the temperature of the incoming exhaust gases. Also, under these operating conditions, the engine output power is negative, that is, it is actually used to brake the car instead of propelling the car forward. Thus, for this situation, the reduced air-fuel charge delivered to the engine because of the high percentage of exhaust gas being recirculated therethrough, in accordance with the invention, has a different significance than when the engine is used to deliver power to drive the vehicle. However, engine braking with this high percentage of exhaust gas recirculation is comparable to normal engine braking without gas recirculation.

From the above description, it is apparent that the exhaust gas recirculating system of the subject invention is not intended to effect a reduction in the rate of exhaust flow through the catalytic converter for a selective positive engine power level. However, when the catalyst high temperature is caused, for example, primarily by very high incoming exhaust temperature, for example, under extra heavy engine operating loads, as when the engine is pulling a trailer, or by a failure mode in the engine, such as fouled plugs with subsequent high hydrocarbon emission, the subject system operates to then limit engine output power so as not to damage the catalyst. It is also apparent that the exhaust gas recirculating system of the invention is not intended to be used to improve engine performance per se, nor does this system enrich the incoming air-fuel mixture to the engine, since the exhaust gases recirculated are introduced downstream of the throttle valve 16 in carburetor 14. The ratio of fuel to incoming air from the air cleaner 12 is determined by normal carburetor action and remains unchanged.

What is claimed is:

1. In combination with an internal combustion engine having a throttle valve controlled induction passage for conducting an air-fuel mixture into the engine for combustion therein and an exhaust means for the discharge of exhaust gases from the engine, the exhaust means including exhaust passage means and a catalytic converter connected to the exhaust passage means at the downstream end thereof, of a bypass duct connected at one end to said exhaust passage means upstream of said catalytic converter and at its opposite end to said intake passage downstream of said throttle valve, a bypass valve pivotally mounted in said bypass duct for movement therein between a closed position and a full open position and, temperature responsive means positioned in thermal relation with said catalytic converter and operatively connected to said bypass valve for effecting movement of said bypass valve between said closed position and said full open position, movement of said bypass valve from said closed position toward said open position occurring at a predetermined temperature in said catalytic converter as sensed by said temperature responsive means, the opening of said valve being proportional to further increases in temperature in said catalytic converter above said predetermined temperature up to a second predetermined temperature at which said bypass valve is in said full open position.

2. In the combination according to claim 1 wherein said temperature responsive means includes an electric torque motor having an output shaft operatively connected to said bypass valve for moving said bypass valve between said closed position and said open position, thermistor means positioned in said catalytic converter in thermal relation to the flow of exhaust gases therethrough for sending an electrical signal corresponding to the temperature of exhaust gases in said catalytic converter and an amplifier to receive said electrical signal and to supply a signal proportional to said electrical signal to said electric torque motor, above a predetermined temperature of exhaust gases in said catalytic converter, so as to effect rotation of said output shaft.

* * * * *